July 19, 1960   J. L. RYE   2,945,572
HYDRAULIC CONTROL OF BRAKES
Filed March 10, 1958   2 Sheets-Sheet 1

INVENTOR
JOHN L. RYE

BY Watson, Cole, Grindle + Watson
ATTORNEYS

July 19, 1960  J. L. RYE  2,945,572
HYDRAULIC CONTROL OF BRAKES
Filed March 10, 1958  2 Sheets-Sheet 2

INVENTOR
JOHN L. RYE

BY
Watson, Cole, Grindle - Watson
ATTORNEYS

United States Patent Office 2,945,572
Patented July 19, 1960

2,945,572

HYDRAULIC CONTROL OF BRAKES

John L. Rye, Allesley, Coventry, England, assignor to The Keelavite Company Limited, Coventry, England, a company of Great Britain Filed Mar. 10, 1958, Ser. No. 720,375

Claims priority, application Great Britain Mar. 12, 1957

12 Claims. (Cl. 192—8)

This invention relates to power transmission systems of the kind incorporating a motor, and a brake arranged to act on a driven member driven by the motor, so as to enable power to be transmitted to such driven member by the motor when desired and also to enable the rotation of such driven member to be checked and the driven member to be held stationary by the brake when desired.

The invention may be applied to systems in which the motor is arranged to drive the driven member in one direction only or is arranged to drive the driven member in both directions and is particularly concerned with an arrangement for controlling the brake acting on the driven member in a manner which will enable the movements of the driven member to be satisfactorily controlled at all times. In a wellknown arrangement of the kind referred to embodying a hydraulic motor for hoisting apparatus, the brake remains applied as by means of a spring during the intervals between hoisting and lowering operations and is released hydraulically by the hydraulic pressure applied to the motor to cause operation of the motor. In such known arrangements the pressure necessary to release the brake must be high, namely a pressure corresponding to that required for hoisting the maximum load, since otherwise, when the maximum load is being hoisted the brake would be released before the pressure applied to the motor was sufficient to lift the load and the load would therefore drop initially under these conditions. With such arrangements, therefore, when only a light load is being handled, the brake remains applied until a hydraulic pressure has been applied to the motor much greater than that necessary to lift the load with the result that the hoisting operation will start with a jolt. An object of the present invention is to provide an arrangement in which these difficulties will be overcome.

A power transmission system according to the present invention incorporating a motor, and a brake arranged to act on the driven member of the motor, includes at least one movable anchoring member through which the reaction due to braking is transmitted to means for applying and releasing the brake, and control means including means for controlling the torque applied to the driven member by a motor and brake-releasing means responsive to movement of the anchoring member and arranged to bring into operation the brake-releasing means approximately as and when the torque applied by the motor to the driven member equals the torque applied to the driven member by any load thereon.

It will be seen therefore that with arrangements according to the invention the movable anchoring member will move from one limiting position to the other as the conditions change from those in which the torque applied to the driven member by any load is greater than any opposite torque applied to the driven member by the motor, to the conditions in which the torque applied to the driven member by the motor exceeds that applied to the driven member by any load. Thus, with arrangements according to the invention the brake is released almost or exactly at that instant when the motor applies just that torque which is sufficient to lift whatever load happens to be carried and a smooth and satisfactory operation therefore tends to be obtained.

When, as will usually be the case, as for example when the invention is applied to hoisting apparatus, the motor is arranged to drive the driven member in either direction, the brake releasing means will include means by which the brake is not only released in the manner described above when the motor applies torque in the lifting direction but also to be released automatically when the motor applies torque in the lowering direction. Thus in a convenient arrangement of this kind the brake-releasing means will include means operable by movement of the anchorage in either direction from a neutral position so associated with the control means for the motor that when such control means are operated to cause the motor to apply torque in the appropriate direction the brake is released provided that the movable anchorage is in the correct one of its two limiting positions.

For convenience the invention will hereinafter be assumed to be applied to such hoisting apparatus.

The invention is particularly but not exclusively applicable to arrangements in which the motor is of the hydraulic type and in this case the control means conveniently includes valve mechanism by which the torque applied by the motor can be controlled by controlling the supply of the hydraulic fluid thereto, and brake- releasing means including a hydraulically operated releasing member the supply of hydraulic fluid under pressure to which is controlled by a valve actuated by the movable anchorage. Where the hydraulic motor is arranged to be driven in one direction only, namely the lifting direction, the source of pressure controlled by the pilot valve may be independent of the hydraulic motor or may be taken from the pressure supply passage through which pressure fluid passes to the hydraulic motor for operation in the lifting direction. When on the other hand, the hydraulic motor is arranged to be driven in both directions the arrangement is conveniently such that the source of hydraulic fluid for the hydraulically operated releasing member when the motor is to be driven in the lowering direction is derived from the fluid supply passage through which fluid is delivered under pressure to the motor for this purpose. Thus, although the hoisting gear may be under load and the movable anchorage member may therefore occupy the corresponding position, hydraulic fluid for releasing the brake can only be supplied to the hydraulic releasing member when fresh fluid is delivered through the appropriate passage of the motor to "drive" the load downwards.

One arrangement according to the invention as applied to hoisting mechanism is shown diagrammatically in the accompanying drawings in which.

Figure 1:
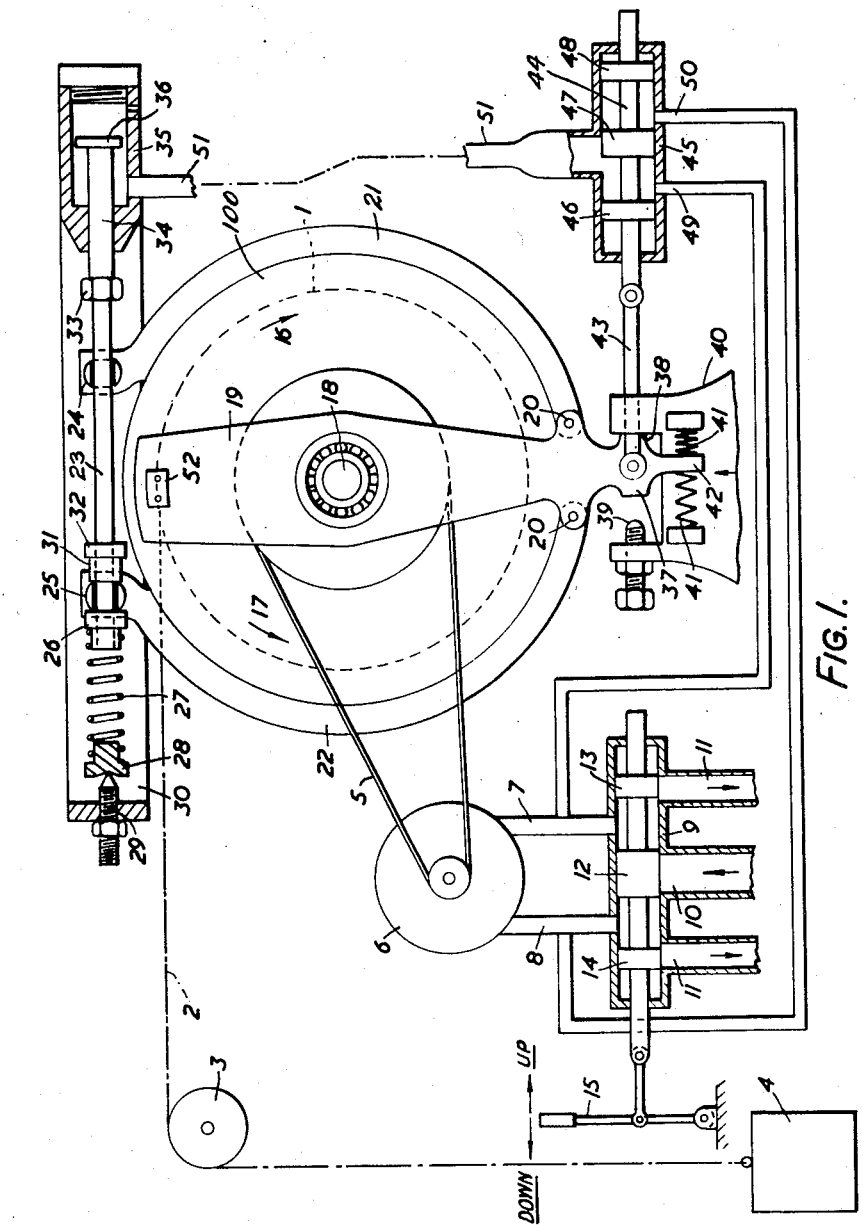
Figure 1 is a diagram of the complete arrangement.

In the construction shown, the apparatus comprises a hoisting drum 1 around which is wound the normal hoisting cable 2 passing over a pulley 3 and supporting a load indicated at 4. The drum 1 is arranged to be driven in either direction through transmission mechanism indicated at 5 by a reversible hydraulic motor 6 having fluid inlet and outlet passages 7 and 8 either of which can be connected by a control valve, indicated generally at 9, to a passage 10 leading to a source of fluid under pressure while the other is connected to one or other of two relief passages indicated at 11. The valve 9 is of wellknown type comprising a cylinder in which is arranged to slide a valve having three piston parts or lands 12, 13 and 14 arranged in wellknown manner to control selectively communication between the passages 10 and 11 and the passages 7 and 8, so that when the piston parts 12, 13, 14 are moved to the right from a central neutral position by movement of a control lever indicated at 15 to the right from its central neutral position, the passage 8 is connected to the passage 10 and the passage 7 is connected to the right hand passage 11 and the motor is thereby caused to drive the drum 1 in the lifting direction indicated by the arrow 16, whereas movement by the control lever 15 of the piston parts 12, 13, 14 to the left from their central neutral position connects the passage 7 to the passage 10 and connects the passage 8 to the left-hand passage 11 so that the drum 1 is driven in the lowering direction indicated by the arrow 17.

The piston parts 13 and 14 are so formed or disposed that when the valve is in its central neutral position the passages 7 and 8 are connected through small gaps to their associated relief passages 11 respectively.

Freely mounted upon the shaft 18 of the drum 1 is a movable anchorage member 19 to which are pivoted at pivots 20 a pair of brake shoes 21, 22 arranged to act on a brake drum 100 rigid with the drum 1.

Carried by and connecting the ends of the brake shoes 21, 22 remote from the pivots 20 is an assembly for applying and releasing the brake constituted by the shoes 21, 22 and the brake drum. This assembly comprises a rod 23 which extends through bores in reaction members 24, 25 carried respectively by the adjacent ends of the brake shoes 21, 22. Secured to one end of the rod 23 is a thrust collar 26 on which acts one end of a compression spring 27 the other end of which acts on a thrust member 28 arranged to be adjustable by means of an abutment screw 29 in relation to one end of a frame member 30 to which the reaction member 24 is attached, the frame member being arranged to move freely with the brake shoes 21, 22 i.e. it is not attached to any rigid part. Also mounted on the rod 23 is an adjustable thrust member 31 capable of being locked in position by a lock nut 32 and disposed so as to act on the face of the member 25 remote from the spring 27.

The end of the rod 23 remote from the spring 27 carries a head 33 arranged to be acted upon by one end of a hydraulic piston 34 the inner end of which lies within a hydraulic cylinder 35 forming part of the frame member 30. The hydraulic piston 34 carries a head 36 on its inner end which does not make a close fit within the cylinder 35 but acts as a stop, limiting movement of the piston. The effective part of the cylinder 35 is therefore the small-diameter part through which the main part of the piston 34 passes with a close working fit. In other words, fluid under pressure admitted to the cylinder 35 tends to increase the volume of the interior of the cylinder by forcing the piston 34 to the left relatively to the cylinder.

The lower end of the movable anchorage member 19 is formed with a projection 37 having limited movement between a fixed stop surface 38 and an adjustable stop 39 both carried by a fixed part indicated at 40. Light coil springs 41 also act upon a finger 42 on the projection 37 so as to tend to maintain the projection 37 mid-way between the stop surface 38 and the stop 39.

Pivotally connected to the projection 37 is a link 43 arranged to actuate a pilot valve of the piston type 44 arranged within a cylinder housing 45 and having three piston parts or lands 46, 47, 48 arranged to control communication between passages 49 and 50 (which communicate respectively with the passages 7 and 8) and a passage 51 which leads to the interior of the cylinder 35.

The arrangement is such that when the projection 37 engages the stop surface 38 the valve 44 brings the passage 49 into communication with the passage 51, when the projection 37 engages the stop 39 the valve 44 brings the passage 50 into communication with the passage 51, whereas when the projection 37 occupies its neutral intermediate position the passages 49 and 50 both communicate through small gaps with the passage 51.

Figure 2:
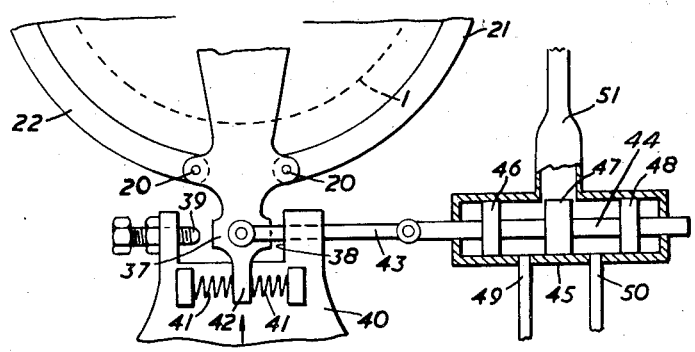
Figures 2 and 3 show two alternative positions which the pilot valve may occupy.
Figure 3:
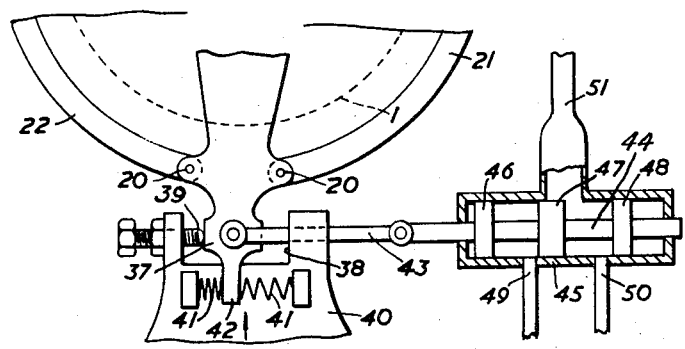

The operation is as follows:

Assuming the drum 1 is under no load so that the coil springs 41 maintain the projection 37 midway between the stop surface 38 and the stop 39, the position of the link 43 is such that the valve 44 occupies its neutral position as shown in Figure 2. The passages 7 and 8 will at this time communicate by small gaps with the passages 11 so that the passages 49, 50 and 51 will similarly be open to relief and the spring 27 will maintain the brake applied to the brake drum 100. If now the lever 15 is moved to the right, the passage 8 will be connected to the passage 10 and the passage 7 fully connected to its passage 11 and the motor will thus be driven in a direction to apply lifting torque to the drum 1. As soon as this lifting torque exceeds any load now applied to the drum 1 through the cable 2 the drum and hence the movable anchorage member 19 will rock so that the projection 37 engages the stop 39 as shown in Figure 3. The valve 44 will therefore be moved to the left and will connect the passage 50 (i.e. the passage 8) to the passage 51 so that pressure fluid will be delivered to the cylinder 35 to release the brake. The moment that the lever 15 is moved to stop the motor 6 the brake will be reapplied due to the release of pressure through the passages 51, 49, 50, 7, 8 and 11. If now there is a substantial load on the cable 2 the movable anchorage member 19 will move so that the projection 37 engages the stop surface 38 as shown in Figure 1 but this will not cause release of the brake because in these circumstances there is no pressure available in the passages 7 and 49 to act through the passage 51 on the piston 34. When however the load is to be lowered and the lever 15 is therefore moved to the left the passage 7 is put under pressure and this pressure therefore passes through the passage 49 into the passage 51 to release the brake.

The movable anchorage 19 may carry a light spring-pressed pad indicated at 52 bearing upon the face of the drum 100 so that when the brake shoes 21, 22 are in their released positions nevertheless the movable anchorage 19 will be moved and maintained in a position dependent upon the direction of movement of the drum 1.

What I claim as my invention and desire to secure by Letters Patent is:

1. A power transmission system including a motor, a driven member arranged to be driven by driving torque generated by the motor, a brake arranged to apply a braking force to the driven member, brake release means, power control means for controlling the said motor, a fixed part to receive the reaction due to braking, at least one anchoring member operatively interconnecting the brake and said fixed part to transmit such reaction and having limited movement relatively to said fixed part, and brake-release control means operated by the anchoring member to cause operation of the brake release means to release the brake on the occurrence of such relative movement due to the driving torque overcoming the reverse torque applied to the driven member by a load thereon.

2. A power transmission system as claimed in claim 1 in which the motor is arranged to drive the driven member in either direction, and the brake-release control means includes means operatively connected to the power control means and operable by movement of the anchoring member in either direction from a neutral position to release the brake incident to operation of the power control to cause the motor to apply driving torque in either direction.

3. A power transmission system as claimed in claim 2 in which the motor is of the hydraulic type, the power control means includes a supply of hydraulic fluid under pressure communicating with said motor, control valve mechanism by which the driving torque of the motor can be controlled by controlling the supply of hydraulic fluid thereto, and the brake-release control means includes a hydraulically-operated releasing member and a pilot valve operatively connected to and actuated by the movable anchoring member for controlling the supply of hydraulic fluid under pressure.

4. A power transmission system as claimed in claim 3 in which said hydraulic motor has supply and exhaust passages communicating with and controlled by the pilot valve, said pilot valve being a two-way valve arranged so that upon movement in either direction from its neutral position it serves to connect the hydraulically-operated releasing member to the fluid supply and exhaust passages of the hydraulic motor.

5. A power transmission system as claimed in claim 1 in which the motor is of the hydraulic type, the power control means includes control valve mechanism by which the driving torque can be controlled by controlling the supply of hydraulic fluid thereto, and the brake-release means includes a hydraulically-operated releasing member, a pilot valve controlling the supply of hydraulic fluid under pressure to said releasing member, said pilot valve actuated by the movable anchoring member.

6. A power transmission system as claimed in claim 3 in which the pilot valve is a two-way valve and is arranged so that upon movement in either direction from its neutral position it serves to connect the hydraulically-operated releasing member to the fluid supply and exhaust passages of the hydraulic motor.

7. A power transmission system including a motor, a rotary driven member arranged to be driven by driving torque generated by the motor, a brake arranged to apply a brake force to the driven member, brake release means, power control means for controlling the said motor, a fixed part to receive the reaction due to braking, at least one anchoring member operatively connected to the brake, the brake and said anchoring member being mounted for limited angular movement together about the axis of the rotary driven member to transmit such reaction to such fixed part, the fixed part being in the path of said angular movement of the anchoring member, and brake release control means operated by the anchoring member to cause operation of the brake release means to release the brake on the occurrence of such relative angular movement due to the driving torque overcoming the reverse torque applied to the driven member by a load thereon.

8. A power transmission system as claimed in claim 7 in which the motor is arranged to drive the rotary driven member in either direction, and the brake release control means includes means operatively connected to the power control means and operable by angular movement of the anchoring member in either direction from a neutral position, to release the brake incident to operation of the power control to cause the motor to apply driving torque in either direction.

9. A power transmission system as claimed in claim 8 in which the motor is of the hydraulic type having inlet and outlet passages, the supply of hydraulic fluid under pressure to which respectively causes rotation of the motor in one direction or the other, the power control means includes control valve mechanism by which the supply of hydraulic fluid to the two said passages is selectively controlled, and the brake release control means includes a hydraulically operated releasing member for releasing the brake, said hydraulic passages communicating with said release member, and a pilot valve controlling said communication, said pilot valve being actuated by the movable anchoring member and having an intermediate neutral position in which both the said passages of the motor are connected to the hydraulically operated releasing member, the passage so connected being that to which hydraulic fluid under pressure is delivered for the application of torque to the driven member in a direction which will tend to move the anchoring member into or maintain it in such position.

10. A power transmission system as claimed in claim 1 including slipping friction means between the driven member and the anchoring member.

11. A power transmission system as claimed in claim 10 in which the motor is arranged to drive the driven member in either direction and the brake release control means includes means operatively connected to the power control means and operable by movement of the anchoring member in either direction from a neutral position to release the brake incident to operation of the power control to cause the motor to apply driving torque in either direction, provided that the anchoring member is in the position corresponding to the application of driving torque in that direction.

12. A power transmission system as claimed in claim 7 including slipping frictional means between the rotary driven member and the anchoring member arranged during rotation of the driven member always to move the anchoring member angularly in the same direction as the driven member.

References Cited in the file of this patent

UNITED STATES PATENTS

| | | |
|---|---|---|
| 2,258,307 | Vickers | Oct. 7, 1941 |
| 2,442,125 | Gunning | May 25, 1948 |